United States Patent Office 3,120,473
Patented Feb. 4, 1964

3,120,473
IMPROVEMENTS IN MULTIPLE STAGE
PRODUCTION OF YEAST
Marcel Celestin Honore Deloffre, 9 Rue des Foyers,
Luxembourg, Luxembourg
No Drawing. Filed Oct. 2, 1961, Ser. No. 141,969
Claims priority, application Luxembourg Oct. 21, 1960
8 Claims. (Cl. 195—82)

This invention relates to the production, with aeration, of yeast which is particularly suitable for use in baking, for dietetic and vitamin enriched products and for autolysates.

The known processes for the production, with aeration, of baker's yeast generally comprises two distinct phases:
(a) Production of seed yeast or mother yeast;
(b) Production of commercial yeast.

The production of seed yeast or mother yeast depends upon the process employed in the factory. The method and the race of yeast are so chosen as to obtain a final product of good quality. The pure culture is generally developed in the laboratory and, after various treatments in pure culture apparatus, the mother yeast is finished under industrial conditions.

In all processes, the nutrient substance for the development of the mother yeast is composed of carbohydrates, such as are obtained from grains saccharified with malt or acid, syrup, molasses (beet or cane) or dried grapes, and it is well known that the quality of the mother yeast (and hence of the final product) depends upon the treatment adopted and upon the conditions existing during the production of the said mother yeast.

The concentration of the worts used in the production of mother yeast is generally from 9° to 12° Balling and it can be appreciated that under such fermentation conditions, in which aeration is necessarily reduced, the yeast yield obtained in this phase is poor and usually varies between 20% and 30% of yeast with between 30% and 20% of alcohol, depending upon the starting material employed.

It can be appreciated that improvement in this phase of the production is of economic importance to the manufacturer, because on the one hand the yeast yields are low and on the other hand the alcohol, even when distilled, is not profitable to the majority of yeast factories.

The mother yeast is separated, washed, and kept in the form of cream at low temperature for the subsequent operations leading to the production of commercial yeast.

The successive operations (first, second and third generations) in the production of yeast have the object of increasing the quantity of seed yeast and thus of producing a mean yield acceptable to the factory. However, these yeasts, multiplied by successive passages through worts of gradually decreasing richness in nutrient substances, gradually lose the original qualities of the mother yeast, which results in degeneration of the cell, and an increase in the amount of infection, the consequence of which is a lowering of the fermenting power and a lack of keeping qualities in the final product.

For the production of commercial bakers' yeast, the concentration of the worts is always lower than that used in the production of the mother or seed yeasts of the first and second generations, because in this later phase the manufacturer endeavours to obtain a maximum amount of yeast and a minimum amount of alcohol.

Various processes for achieving this object are known, and the technique is based upon the continuous, progressive or intermittent feeding of the nutrient solution throughout the fermentation period.

The mean yields of the factory vary substantially in accordance with the process employed, the number of generations produced from the mother yeast, the concentration of the worts and the quality of the final product which it is desired to obtain.

In particular, a process has been described in Australian Patent No. 114,926 in which the alcohol, or alcoholic wort, or the alcoholised wort emanating from the production of the yeast is used as nutrient substantce to the same extent as sugar for producing a higher yeast yield without alcohol at the end of the fermentation.

In this process, fermentation takes place in two distinct phases:
(1) Production of mother yeast, of which the highly alcoholised worts subsequently serve as a nutrient substance in the second "commercial" phase, and
(2) In the second phase, the mother yeast produced and the alcoholised wort are pumped into the commercial fermentation tank, and the alcohol is gradually completely assimilated and converted into yeast with the addition of the other nutrient substances.

This process, which has had many industrial applications, has great advantages over the methods known at present, but is attended by certain disadvantages.

It is quite obvious that in this so-called "alcohol" process, the alcoholic phase becomes important. It must be so calculated that the mother yeast yield represents about 15% to 18% of the total charge, which means in fact that the quantity of starting materials entering into the production of mother yeast (alcoholic phase) must be approximately 55–65% of the total charge of the two phases.

Moreover, in order to obtain a yield approaching 100%, the quantity of mother yeast, representing 15–18% of the total charge, must be multiplied to a fairly considerable extent, which necessarily lengthens the fermentation time of the commercial phase.

The large volume of alcoholised wort present at the beginning of the commercial fermentation also does not permit an optimum dilution favourable to the rapid development of the yeast, and the alcoholic concentration of the medium is necessarily accompanied by a fairly considerable loss by entrainment due to the aeration.

The main objects of the present invention are to render the manufacture more efficient and more economic, and to ensure that the final product has a fermenting power equal to or greater than that of the best yeasts and a better keeping quality, to produce quantities of alcoholic mother yeast fermented in alcoholised wort, ranging from 45% to 65% by weight of the starting material employed in the alcoholic fermentation, and to render possible the seeding of the commercial phase with a quantity of alcoholic mother yeast of about 30% of the total charge of the operation.

In accordance with the present invention there is provided a process for the production of yeast by aerobic fermentation which comprises two distinct phases A and B, wherein in phase A a wort containing sacchariferous material and nutrient salts is inoculated with a yeast culture and fermentation is continued to produce both yeast and alcohol, in phase B the fermentation broth obtained at the end of phase A is diluted and the fermentation is continued with the addition of further sacchariferous material and nutrient salts to generate yeast and further alcohol and/or to generate yeast and effect the partial resorption of alcohol, and the resulting fermentation broth is then subjected to a third phase C of fermentation, with addition of further sacchariferous material and nutrient salts until all the alcohol is resorbed.

It will be noted that, in contradistinction to the known processes, the process of the present invention comprises the production of mother yeast in two distinct alcoholic phases (A and B) and the production of commercial yeast (phase C) without interruption after the production of mother yeast.

In the production of alcoholic yeast according to the first two phases of the present invention, the following are the preferred conditions.

The quantity of sacchariferous starting material entering the phases A and B preferably represents about 50% of the total charge of the operation. In the first phase of the alcoholic fermentation (phase A), from 50% to 60% of the quantity of sacchariferous starting material entering these two phases is diluted in a culture apparatus, nutrient salts are added and the liquid is cooled to 30° C. The dilution in this phase is from about 1 to 9 to 1 to 12 and a selected quantity of culture is inoculated into the mass with all the usual precautions.

The quantity of culture yeast to be seeded will vary in accordance with the fermentation time chosen for this phase and will usually range between 0.2% and 0.7% of the total charge of the operation.

Preferably, in this fermentation phase 80–90% of the sugar present should be converted into alcohol.

The quantity of air introduced may be from 30 to 45 cubic metres of sterile air per hour to 100 hectolitres of wort.

The alcoholic phase A can be controlled in accordance with the dilution of the wort (measured on the Balling scale). The Balling reduction may be from 55% to 60% in the case of beet molasses.

The wort is immediately transferred into the fermentation tank and the alcoholic phase B commences.

The yeast yield obtained in the alcoholic phase A is usually approximately 28% to 30% calculated on the molasses, and the alcohol represents about 57% of the fermentable sugar introduced into the phase.

The fermentation time is from 7 to 11 hours, depending upon the quantity of inoculum.

It has been found advantageous, before commencing the phase B, first to add water to the fermentation tank in order to bring it to the desired dilution, to pump in the alcoholic phase A as rapidly as possible, to run in the sacchariferous solution at the same time, and to effect the aeration so as to prevent stoppage of fermentation.

It is also possible to run in the water and the molasses in the course of the fermentation in order ultimately to obtain the desired dilution.

The duration of the fermentation of the alcoholic phase B is generally 6 or 7 hours, depending on the results which it is desired to obtain. The sacchariferous solution is run in continuously, intermittently or progressively, in such manner that, at the beginning of the fermentation, there is a fermentation of alcohol corresponding approximately to 20% or 30% of the quantity of fermentable sugar introduced.

The aeration is progressive and the nutrient salts are added in the usual way.

The fermentation phase B may be modified in various ways, thus:

(a) After the fourth hour and towards the fifth hour of the running-in period, the supply of sacchariferous solution is adjusted in relation to the aeration so that there is no further formation of alcohol but so that the quantity of alcohol present in the tank commences to disappear as a result of reabsorption.

(b) After the fourth or fifth hour of the running-in period, the supply of sacchariferous solution is adjusted in relation to the aeration so that alcohol is reabsorbed, but the total quantity of alcohol present at the end of the phase B is approximately the same as at the beginning of the phase.

(c) The supply of sacchariferous solution is adjusted so that at the end of the phase B the total quantity of alcohol is increased in a proportion of from 20% to 30% of the total quantity of sugar added in this phase.

It is therefore possible in the fermentation procedure adopted in the alcoholic phase B to obtain different quantities and different yields of alcoholic yeasts.

The pH is maintained between 4.5 and 5.2 and the temperature is maintained at 29–30° C. in the course of the fermentation.

The aeration of the phase B depends upon the design of the fermentation tank and varies between 100 cubic metres and 300 cubic metres per hour per 100 hectolitres of wort undergoing fermentation.

The yields obtained in this phase depend upon the manner in which the fermentation is carried out, but should represent about 22–32% of mother yeast calculated on the total charge of the operation.

It is also possible, if the economic conditions permit, to control phases A and B in such manner that the yeast produced is of a special type and can be commercialised after phases A and B.

In this case, the yeast is separated and compressed and the alcoholised wort is distilled to recover the alcohol therefrom.

The production of commercial yeast (phase C) (without alcohol) at the end of phase B takes place without any interruption.

The alcohol produced during the alcoholic fermentation A—B is gradually reabsorbed until the end of the fermentation.

Experience has shown that it is more economic and advantageous to reabsorb the alcohol at the beginning of the phase C in order to avoid a loss of alcohol by evaporation and to obtain a mean commercial yeast yield which is higher than those obtained by processes of the same type and, in this case, it is recommended to carry out phase B in such manner that the quantity of seed yeast produced at the end of this phase represents approximately 28–30% of the total charge of the operation at the beginning of the phase C.

The nutrient solution added to the commercial fermentation is so treated as to obtain the desired final dilution at the end of the fermentation.

The sacchariferous solution is adjusted run-in in such manner that the total quantity of alcohol contained in the wort at the beginning of the commercial phase C is entirely reabsorbed in the first 5 to 6 hours of the fermentation. When the alcohol has completely disappeared, the remaining saccharified solution is continuously or intermittently added to the fermentation in such manner that the nutrient solution added after the disappearance of the alcohol is entirely converted into yeast.

The quantity of air employed in the commercial phase C is progressive and varies between 400 and 1200 cubic metres of air per hour per 100 hectolitres of wort.

The pH is maintained between 4.5 and 5.2 and the temperature is maintained between 29° and 30° C.

The mineral salts are added in the usual way.

Owing to the advantages obtained in the production of the mother yeast in phases A and B as described, the conditions at the beginning of phase C are extremely favourable to a rapid reabsorption of the alcohol. The aeration, which is progressive, is much less intense than towards the end of the fermentation, and the loss of alcohol by entrainment due to the aeration is much smaller than in the process in which the alcohol is pregressively reabsorbed until the end of the fermentation.

This results in a substantial saving of nutrient substances, by virtue of which it is possible to obtain yields higher by about 10% than in the known processes of the same type. Moreover, the commercial fermentation is more rapid. The following examples illustrate the invention.

EXAMPLE I

The total charge of the operation is 9,000 kilograms of beet molasses containing 49% of sugar.

The quantity of molasses entering the phase A is 2,700 kilograms and that entering the phase B is 1800 kilograms, representing a total of 4,500 kilograms for the two phases, that is to say, 50% of the total charge.

The 2,700 kilograms of molasses are clarified in the usual way and the necessary quantities of mineral salts are added in accordance with the known practice. The liquor is poured into a culture tank with water, and the wort is cooled to 30° C. The final volume is 300 hectolitres. The liquid is inoculated with 20 kilograms of yeast of a selected pure culture. The aeration is adjusted to a rate of 125 cubic metres of air per hour and the fermentation lasts 10½ hours.

At the end of the fermentation, the yeast contained in the tank represents 870 kilograms and the quantity of alcohol is 740 l.

The wort is pumped as rapidly as possible into the fermentation tank after having been diluted with water to a volume of 540 hectolitres, and phase B commences without any interruption.

The duration of phase B is 7 hours.

The quantity of molasses introduced each hour is mixed with water to obtain the appropriate dilution.

At the end of phase B, the alcohol, of which there were 740 litres at the beginning of the fermentation, amounts to 702 litres, while on the other hand the yeast, of which there were 870 kilos, amounts to 2850 kilos, and represents a yeast yield of 63.3% and an alcohol yield of 15.7% calculated on the molasses introduced into the two phases.

It may also be noted that the fermentation is so controlled that during the first 4 to 5 hours of phase B alcohol is produced and then, from the sixth hour, reabsorption of the alcohol commences.

At the end of phase B, phase C commences without any interruption and it can be seen that the alcohol has completely disappeared before the sixth hour of the third phase.

The fermentation process can be followed from the table given below.

*Table 1*

| Phases | Hour | Volume of wort in hectolitres | Total yeast, kg. | Total alcohol, litres | Alcohol formed, litres | Alcohol absorbed, litres |
|---|---|---|---|---|---|---|
| Phase A | Beginning: 11 | 300 | 220 | | | |
|  | End: 21.30 | 300 | 870 | 740 | 740 | |
| Phase B | 22 | 540 | 870 | 740 | | |
|  | 24 | 662 | 1,340 | 771 | 31 | |
|  | 2 | 786 | 1,877 | 814 | 43 | |
|  | 4 | 932 | 2,497 | 770 | | 44 |
|  | 5 | 1,005 | 2,850 | 702 | | 68 |
| Commercial Phase C | 7 | 1,110 | 3,786 | 525 | | 177 |
|  | 9 | 1,222 | 5,229 | 277 | | 248 |
|  | 11 | 1,365 | 7,060 | | | 277 |
|  | 13 | 1,508 | 8,930 | | | |
|  | 15 | 1,540 | 9,436 | | | |

The yeast is centrifuged, washed and compressed. The quantity of yeast obtained is 9,166 kilograms. The mean dry substance of the yeast is 30.12%. The yeast calculated on 27% of dry substance is 10,225 kg.

The molasses containing 50% of sugar amounts to 8,820 kg. The mean yield calculated on 30.12% of dry substance is 103.93%. The mean yield calculates on 27% of dry substance is 115.92%.

EXAMPLE II

This example employs a more highly concentrated wort fermentation.

For this operation, the total quantity of molasses employed is 12,000 kg. of beet molasses containing 49.6% of sugar.

The quantity of molasses entering phase A is 3,600 kg., and that entering phase B is 2,400 kg., representing a total of 6,000 kg. for these two phases, i.e. 50% of the total charge.

The technique is approximately the same as in Example I, except that in the present example the dilutions vary slightly.

The wort in phase A of this operation is inoculated with 22 kg. of yeast of selected pure culture. The aeration is adjusted to a rate of 170 cubic metres of air per hour and the fermentation lasts 12 hours. At the end of the fermentation of phase A, the yeast contained in the tank represents 1,083 kg. and the quantity of alcohol is 1,015 litres.

After pumping, phase B commences without interruption. The duration of phase B is 7 hours.

The quantity of molasses is run in at the same time as the water to produce the appropriate dilution.

At the end phase B, the alcohol, of which there were 1,015 litres at the beginning of the phase, amounts to 1,030 litres. On the other hand, the yeast, of which there were 1,083 kg. amounts to 3,246 kg. at the end of phase B, representing a yeast yield of 54.1% and an alcohol yield of 17.1%. It is also to be noted that the alcohol has been formed during the first 4 to 5 hours of phase B, and that a reabsorption of alcohol commences at the sixth hour.

At the end of phase B, the commercial phase C commences without interruption, and it can be seen that at the end of the sixth hour only 36 litres of alcohol remain.

The process of fermentation can be followed from the table given below.

*Table II*

| Phases | Hour | Volume of wort in hectolitres | Total yeast, kg. | Total alcohol, litres | Alcohol formed, litres | Alcohol absorbed, litres |
|---|---|---|---|---|---|---|
| Phase A | Beginning: 10.30 | 470 | 22 | | | |
|  | End: 22.30 | 470 | 1,083 | 1,015 | 1,015 | |
| Phase B | 23 | 1,220 | 1,083 | 1,015 | | |
|  | 1 | 1,262 | 1,505 | 1,074 | 59 | |
|  | 3 | 1,310 | 2,110 | 1,139 | 65 | |
|  | 5 | 1,355 | 2,721 | 1,101 | | 38 |
|  | 6 | 1,375 | 3,246 | 1,030 | | 71 |
| Commercial Phase C | 8 | 1,390 | 4,223 | 838 | | 192 |
|  | 10 | 1,404 | 5,573 | 516 | | 322 |
|  | 12 | 1,425 | 7,369 | 36 | | 480 |
|  | 14 | 1,452 | 9,249 | | | 36 |
|  | 16 | 1,482 | 11,098 | | | |
|  | 18 | 1,506 | 11,967 | | | |

The yeast is centrifuged, washed and compressed. The quantity of yeast obtained amounts to 11,564 kg. The mean dry substance of the yeast is 30.58%.

The yeast calculated on 27% of dry substance is 13,097 kg.

The amount of molasses containing 50% of sugar is 11,904 kg. The mean yield calculated on 30.58% of dry substance is 97.14%. The mean yield calculated on 27% of dry substance is 110.02%.

What I claim is:

1. A three phase process for the growth of yeast by aerobic fermentation comprising phases A, B and C and wherein:

Phase A—comprises the steps of preparing a wort containing water, sacchariferous material and nutrients, inoculating said wort with a selected yeast culture, and allowing the mass to ferment for a period of about 11 hours, and aerating said mass during fermentation;

Phase B—comprises the steps of diluting the mass produced in phase A with about an equal volume of water, feeding diluted sacchariferous material thereto during a period of about seven hours, allowing the yeast to grow while the alcohol content of the mass rises and thereafter recedes to about the initial alcohol content at the beginning of phase B; and Phase C—comprising the steps of adding to the mass produced in phase B, sacchariferous material in an amount about equal to the total amount used during phases A and B, during a period of about ten hours during which the mass continues to undergo yeast growth and the alcohol present at the beginning of phase C is substantially completely consumed.

2. Process according to claim 1, wherein, after phase A, the wort is immediately transferred into a fermentation tank and phase B immediately commences.

3. Process according to claim 1, wherein, before phase B is commenced, water is added to a fermentation tank to produce the desired dilution, the broth from phase A is pumped into said fermentation tank, the racchariferous solution is run-in at the same time, and aeration is effected so as to avoid stoppage of the fermentation.

4. A process according to claim 1, wherein water and the sacchariferous solution are supplied during the course of the fermentation in phase B in order to obtain the desired dilution at the end of phase B.

5. A process according to claim 1, wherein the duration of the fermentation of phase B is about 6 hours and the sacchariferous solution is run-in at a rate whereby alcohol is formed in an amount corresponding approximately to 25% of the quantity of fermentable sugar introduced into phase B.

6. Process according to claim 1, wherein the duration of the fermentation of phase B is about 6½ hours and the sacchariferous solution is run-in at a rate whereby after the fourth to the fifth hour of the running-in period, the supply of the sacchariferous solution is adjusted in relation to the aeration so that there is no further formation of alcohol, and the alcohol present in the tank commences to disappear.

7. Process according to claim 1, wherein the duration of the fermentation of phase B is about 6½ hours and the sacchariferous solution is run-in at a rate whereby, after the fourth to fifth hour of the running-in period, the supply of the sacchariferous solution is adjusted in relation to the aeration so that partial resorption of alcohol takes place andd the total quantity of alcohol present at the end of phase B is approximately the same as that at the beginning of phase B.

8. Process according to claim 1, wherein the supply of the sacchariferous solution in phase B is adjusted so that at the end of phase B the total quantity of alcohol is increased in the proportion of 20–30% of the total quantity of sugar introduced in phase B.

References Cited in the file of this patent

UNITED STATES PATENTS

| | | |
|---|---|---|
| 700,833 | Schneible | May 27, 1902 |
| 963,458 | Moeller | July 5, 1910 |
| 1,962,831 | Moskovits | June 12, 1934 |
| 2,054,736 | Boinot | Sept. 15, 1936 |
| 2,371,208 | Algola | Mar. 13, 1945 |
| 2,372,854 | Reich | Apr. 3, 1945 |
| 2,440,545 | Jeffreys | Apr. 27, 1948 |
| 2,817,624 | Dulaney | Dec. 24, 1957 |